(12) United States Patent
Zhang et al.

(10) Patent No.: US 11,974,175 B2
(45) Date of Patent: Apr. 30, 2024

(54) HANDOVER CONTROL METHOD AND COMMUNICATIONS DEVICE

(71) Applicants: SHARP KABUSHIKI KAISHA, Tuen Mun (JP); FG Innovation Company Limited, Tuen Mun (HK)

(72) Inventors: Chongming Zhang, Shanghai (CN); Renmao Liu, Shanghai (CN)

(73) Assignees: SHARP KABUSHIKI KAISHA, Sakai (JP); FG Innovation Company Limited, Tuen Mun (HK)

( * ) Notice: Subject to any disclaimer, the term of this patent is extended or adjusted under 35 U.S.C. 154(b) by 320 days.

(21) Appl. No.: 17/290,438

(22) PCT Filed: Nov. 1, 2019

(86) PCT No.: PCT/CN2019/115022
§ 371 (c)(1),
(2) Date: Apr. 30, 2021

(87) PCT Pub. No.: WO2020/088651
PCT Pub. Date: Jul. 5, 2020

(65) Prior Publication Data
US 2022/0038963 A1 Feb. 3, 2022

(30) Foreign Application Priority Data
Nov. 1, 2018 (CN) .......................... 201811294705.3

(51) Int. Cl.
H04W 36/00 (2009.01)
H04W 36/08 (2009.01)

(52) U.S. Cl.
CPC .... *H04W 36/0055* (2013.01); *H04W 36/0011* (2013.01); *H04W 36/08* (2013.01)

(58) Field of Classification Search
CPC .. H04W 36/0011; H04W 36/08; H04W 36/36
See application file for complete search history.

(56) References Cited

U.S. PATENT DOCUMENTS

2015/0111580 A1 4/2015 Wu
2017/0181044 A1 6/2017 Wen et al.
(Continued)

FOREIGN PATENT DOCUMENTS

CN 104822169 A 8/2015
WO 2018/083649 A1 5/2018
(Continued)

OTHER PUBLICATIONS

NTT DOCOMO, "New SID Proposal: Study on New Radio Access Technology", 3GPP TSG RAN Meeting #71 Goteborg, Sweden, RP-160671, Mar. 7-10, 2016.
(Continued)

Primary Examiner — Kabir A Timory
(74) Attorney, Agent, or Firm — ScienBiziP, P.C.

(57) ABSTRACT

A handover control method of a source base station (BS). The method includes: transmitting a conditional handover request to a target BS; when a handover request confirmation message is received from the target BS, transmitting a conditional handover message to a user equipment (UE); and receiving a conditional handover complete message from the target BS in response to a Radio Source Control (RRC) connection reconfiguration complete message being sent from the UE to the target BS.

12 Claims, 6 Drawing Sheets

(56) References Cited

U.S. PATENT DOCUMENTS

2018/0279193 A1    9/2018  Park et al.
2020/0077314 A1*   3/2020  Hwang ................ H04W 36/08

FOREIGN PATENT DOCUMENTS

| WO | 2018/132051 A1 | 7/2018 |
| WO | 2018/156696 A1 | 8/2018 |
| WO | 2018/170777 A1 | 9/2018 |
| WO | 2018/175819 A1 | 9/2018 |

OTHER PUBLICATIONS

NTT Docomo, Inc, "Inter Master Node handover with Secondary Node change", R3-174116, 3GPP TSG-RAN WG3 #97bis, Prague, Czech Republic, Oct. 9-13, 2017 (2017-10-13).

LG Electronics Inc, "Support of DC based handover with conditional handover for Oms interruption", R2-1802541, 3GPP Tsg-Ran WG2#101, Athens, Greece, 26th February - Mar. 2, 2018 (2018-03-02).

* cited by examiner

HANDOVER CONTROL METHOD AND COMMUNICATIONS DEVICE

CROSS-REFERENCE TO RELATED APPLICATION(S)

This application is a national stage application of International Patent Application PCT/CN2019/115022, filed Nov. 1, 2019, now published as WO/2020/088651. International Patent Application PCT/CN2019/115022 claims the benefit of CN Patent Application 201811294705.3, filed Nov. 1, 2018. CN Patent Application 201811294705.3 and International Patent Application PCT/CN2019/115022, now published as WO/2020/088651, are incorporated herein by reference.

FIELD

The present disclosure generally relates to wireless communications, and more particularly, to handover control methods and communications device according to the present disclosure.

BACKGROUND

As mobile communication grows and its technology improves, the world is moving into a community that is a completely interconnected network and that is where anyone or anything can obtain information and share data at anytime and anywhere. It is estimated that there are 50 billion devices that are interconnected in 2020, and among those devices, only 10 billion devices are mobile phones and tablet computers. The rest are devices not communicating between humans but between each other. Therefore, how to design a system that better supports networks connecting all things requires more in-depth study and research.

Studies of the new 5G radio access technology were performed (referring to a non-patent publication: RP-160671 New SID Proposal: Study on New Radio Access Technology) in the #64 plenary meeting for RAN of the 3rd generation partnership program (3GPP) held in March 2016. One of the research objectives of this project is to find a solution that meets the mobility requirements in NR: seamless handover, that is, a handover interruption time of 0ms may be met during cell handover. Among the solutions under study to reduce the handover interruption time, there is a solution called Conditional Handover (Conditional Handover, CHO). In the CHO mechanism, the base station issues a handover command to the UE in advance and configures the UE to perform handover, when certain conditions are met, according to the handover command received previously. With issuing the handover command in advance, the success rate of handover command reception is improved, and thereby, avoiding the latency caused by service interruptions and the handover failure due to the failure of receiving the handover command.

Unlike conventional handover, when the UE receives the CHO command, it does not immediately perform the handover, but waits until the predetermine conditions are met. For example, when the link quality is below a certain threshold, the CHO is performed. For a UE in single connectivity, the CHO is issued by the source base station, however it is uncertain when it will be performed by the user. Therefore, how the source base station knows to stop data transmission with the UE is a problem that needs to be addressed. Similarly, for a UE in dual connectivity, the source master base station and the source secondary base station serve the UE at the same time. The CHO is issued by the source master base station, however it is uncertain when it will be performed by the user. Therefore, how the source master base station and the source secondary base station know to stop the data transmission with the UE is also a problem that needs to be addressed.

Furthermore, when the target master base station adds the target secondary base station, since the resources allocated by the target secondary base station (corresponding to the relevant configuration of the secondary serving cell) are time-sensitive, which affects the resource management and operation management of the UE and the base station. Therefore, how to avoid connection failure caused by configuration failure is a problem that needs to be addressed. That is to say, how to perform resource management and handover control of the base station while keeping the resources allocated by the target secondary base station effective (timeliness) is a problem that needs to be addressed in present technology.

SUMMARY

To address the above problem, the present disclosure provides a handover control method and communications device.

According to a first aspect of the present disclosure, there is provided a handover control method comprising: a source base station sending a conditional handover request to a target base station; when the source base station receives a handover request confirmation message of the target base station, sending a conditional handover message to a user equipment (UE); and if the target base station receives an RRC connection reconfiguration complete message from the UE, sending a conditional handover complete message to the source base station.

In the above handover control method, when the conditional handover complete message is received, the source base station forwards data to the target base station.

In the above handover control method, when the UE communicates with the source base station including a source master base station and a source secondary base station based on dual connectivity, the target base station sends the conditional handover complete message to the source master base station.

In the above handover control method, when the source master base station receives the conditional handover complete message sent by the target base station, the source master base station sends a secondary base station release request message to the source secondary base station.

In the above handover control method, when a conditional handover based on the conditional handover message is triggered, the UE sends a conditional handover activation message to the source secondary base station.

In the above handover control method, the UE sends the conditional handover activation message before sending the RRC connection reconfiguration complete message.

According to a second aspect of the present disclosure, there is provided a handover control method, wherein a UE in dual connectivity communicates with a source master base station and a source secondary base station, the handover control method comprises: the source master base station sends a conditional handover request to a target base station; when the source master base station receives a handover request confirmation message of the target base station, the source master base station sends a conditional handover message to the UE; and when a conditional handover based on the conditional handover message is triggered, the UE sends a conditional handover activation message to the source secondary base station.

In the above handover control method, the conditional handover activation message is included in a MAC layer control information or an RRC message.

In the above handover control method, the source secondary base station that receives the handover activation message stops sending or providing data to the UE, and sends to the source master base station an indication message indicating that the conditional handover is triggered or activated or performed; the source master base station that receives the indication message stops sending or providing data to the UE.

According to a third aspect of the present disclosure, there is provided a communications device, comprising: a processor; and a memory storing instructions; wherein, the instructions, when executed by the processor, causes the handover control method disclosed herein to be performed.

DESCRIPTION

The following descriptions and accompanying drawings contain detailed descriptions of exemplary implementations of the present disclosure. It should be appreciated that the present disclosure is not limited to the implementations disclosed herein. Additionally, for the ease of understanding, the descriptions do not include detailed descriptions of general knowledge not directly related to the present disclosure in order to avoid confusion of the present disclosure.

Prior to detailed descriptions of the implementations, the following paragraphs defines the terms used in the present disclosure. Unless otherwise specified, the terms in the present disclosure contain the following meanings.

UE User Equipment
NR New Radio
LTE Long Term Evolution
eLTE Enhanced Long Term Evolution
RRC Radio Resource Control (Layer)
MAC Medium Access Control (Layer)
MAC CE MAC Control Element
MCG Master Cell Group
MCG ENB Master eNB, Master Base Station
SCG Secondary Cell Group
SCG ENB Secondary eNB, Secondary Base Station
SRB Signaling Bearer
HANDOVER REQUEST Handover Request
HANDOVER REQUEST ACKNOWLEDGE Handover Request Acknowledgement SENB RELEASE REQUEST Secondary Base Station Release Request (Master Base Station sends, Secondary Base Station receives)
SENB RELEASE REQUIRED Secondary Base Station Release Request (Secondary Base Station sends, Master Base Station receives)
SN STATUS TRANSFER Serial Number Status Transfer
UE CONTEXT RELEASE Context Release For the ease of understanding, the following paragraphs describes implementations applied in NR mobile communications systems and a progression environment. Base stations and UE supporting NR are used as examples to describe various implementations of the present disclosure. However, it should be noted that the present disclosure is not limited to the following implementations. The present disclosure is suitable for various other radio communications systems, such as an eLTE communications system. The present disclosure is also applicable to other base stations and UE, for example, the base stations and UE supporting eLTE.

Before describing specific implementations of the present disclosure, a general conventional handover control method will be briefly described with reference to FIG. 5.

Figure 5:
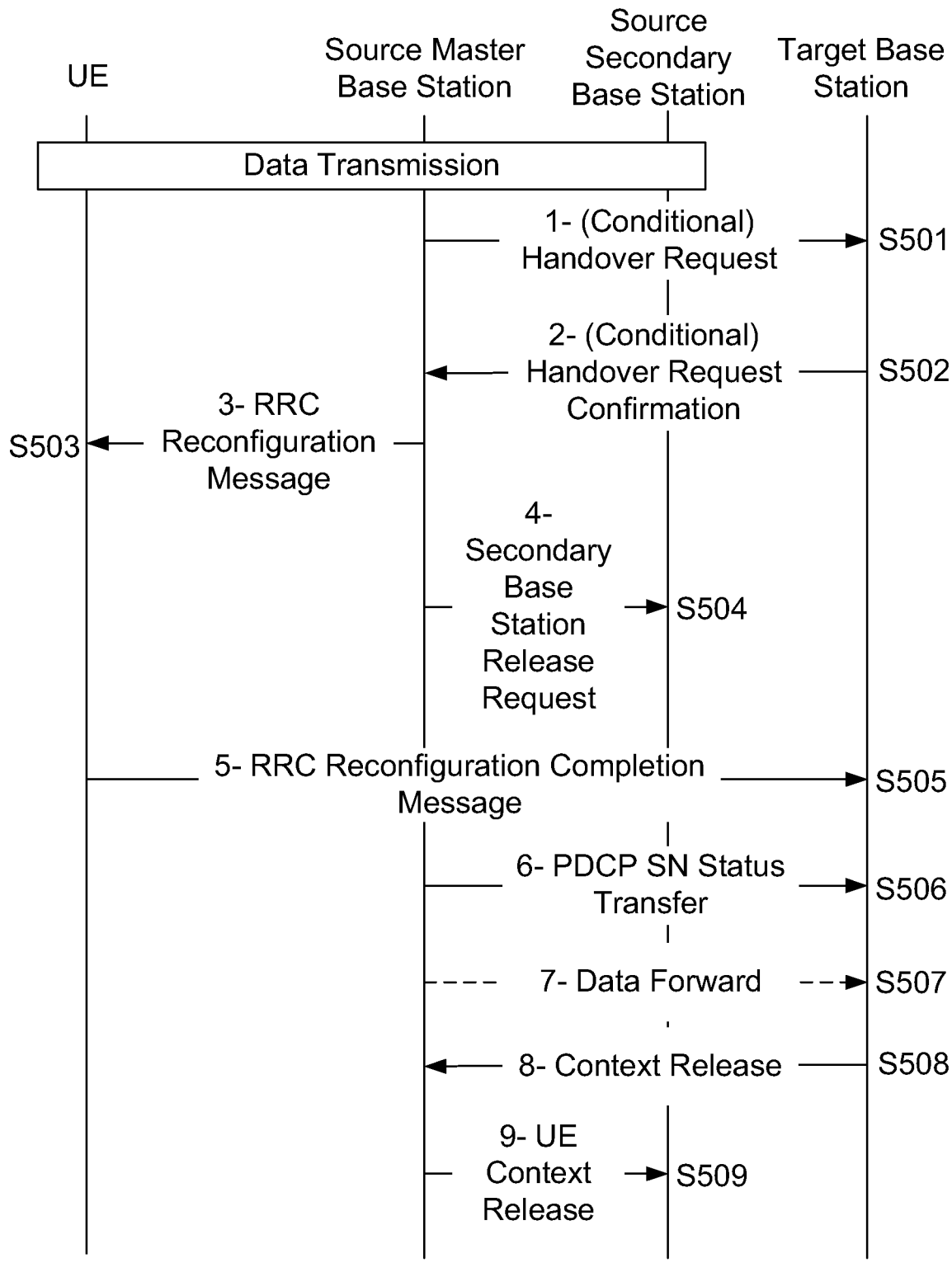
FIG. 5 is a schematic time chart of a conventional handover control method.

FIG. 5 is a schematic time chart of a conventional handover control method. As shown in FIG. 5, the user equipment UE performs data transmission with the source master base station and the source secondary base station. At Step S501, the source master base station sends a handover request to the target base station. After the source master base station receives a handover request confirmation message from the target base station (S502), the source master base station sends an RRC reconfiguration message to the UE (S503), and sends a secondary base station release request to the source secondary base station (S504). Additionally, the source master base station sends a PDCP SN Status Transfer message to the target base station to convey the uplink PDCP SN receiver status and the downlink PDCP SN transmitter stats of DRB(s) for which PDCP status preservation applies (e.g., for RLC AM mode) (PDCP SN Status Transfer) (S506). Then, the source master base station forwards the data that arrives subsequently and the data that has not been successfully transmitted to the target base station (Data Forward) (S507).

In a normal situation, after receiving the RRC reconfiguration message (S503), the UE will immediately perform the handover process and synchronize with a target cell assigned by the target base station. Therefore, the source master base station may directly send the secondary base station release request to the source secondary base station (S504), and forward the data to the target base station (S506). The source secondary base station stops providing data transmission to the UE based on the received release request (S504).

However, in the conditional handover, when the UE receives the RRC reconfiguration message for the conditional handover, the UE waits until the conditional handover conditions are satisfied before performing the handover. The "RRC reconfiguration message for conditional handover" herein may refer to a conditional handover message, or an RRC reconfiguration message carrying configuration information related to conditional handover. Before the UE performs the conditional handover, the communications between the UE and the source master base station and the source secondary base station is performed in a normal manner. Therefore, there is a problem to the handover control in the present art: how the source master base station knows to stop the communications with the UE, and how the source secondary base station knows to stop the communications with the UE.

Hereinafter, specific implementations according to the present disclosure will be described in detail. Furthermore, the implementations of the present disclosure are exemplary implementations for the ease of understanding of the present disclosure, and do not limit the present disclosure.

Implementation 1

Figure 1:
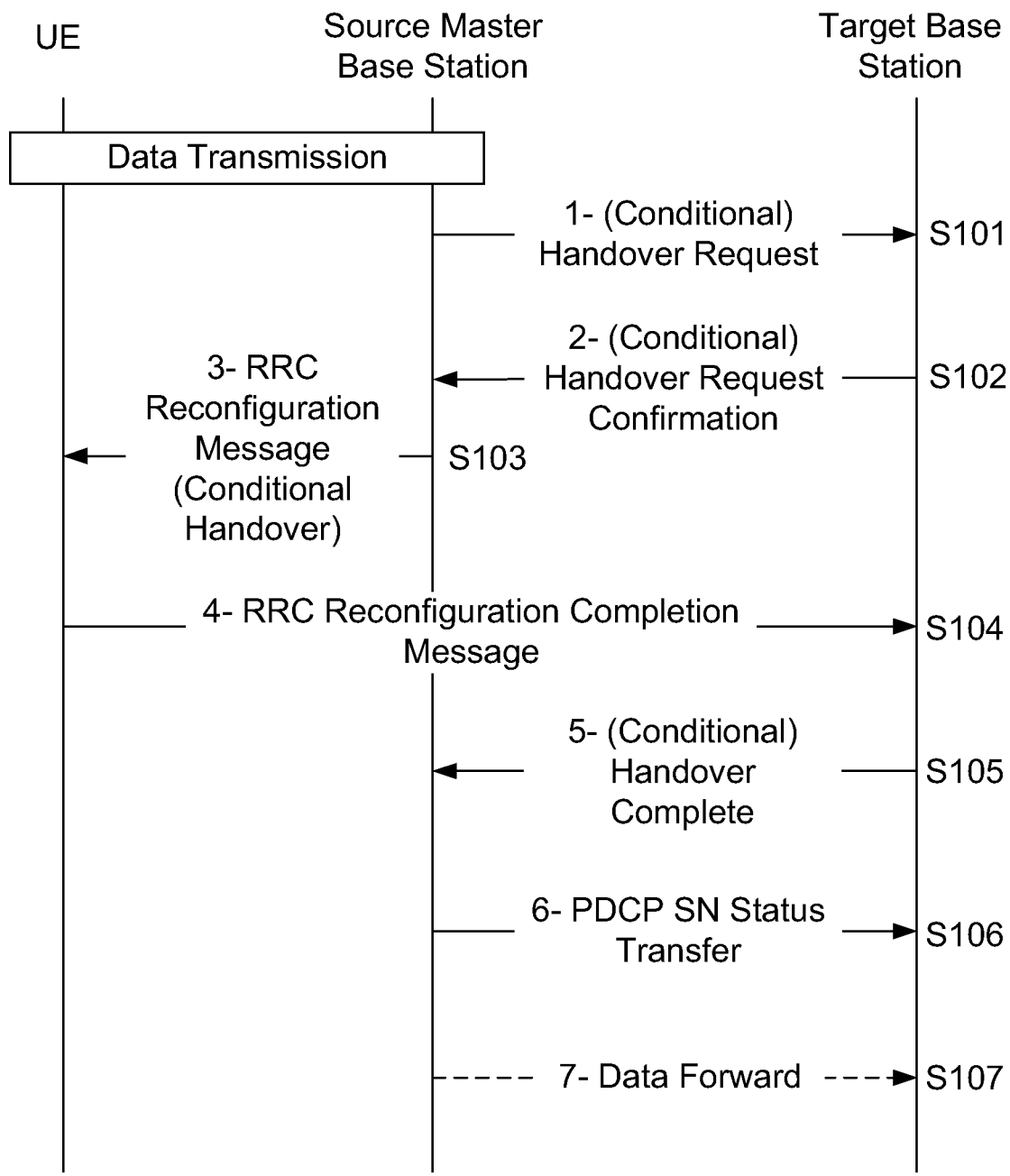
FIG. 1 is a schematic time chart of an implementation of the handover control method of the present disclosure.

Implementation 1 of the present disclosure will be described with reference to FIG. 1. FIG. 1 is a schematic time chart of an implementation of the handover control method of the present disclosure.

As shown in FIG. 1, at Step S101, the source base station sends a conditional handover request to the target base station, and at Step S102, the target base station sends a conditional handover request confirmation to the source base station. After receiving the conditional handover request confirmation sent by the target base station, the source base station sends a conditional handover message to the UE (S103), wherein the conditional handover message may be an RRC reconfiguration message.

After receiving the RRC connection reconfiguration complete message or RRC reconfiguration complete message from the UE (S104), the target base station sends a handover complete message to the source base station (S105). Preferably, the target base station sends a conditional handover complete message to the source base station (S105), which is a message for indicating the conditional handover is completed. The purpose of the message is to notify the source base station that the UE has accessed the target base station, and, optionally, to notify the source base station that the UE performing conditional handover has accessed the target base station or that the UE has performed and completed the conditional handover. It is noted that the term "RRC connection reconfiguration complete message" and the term "RRC reconfiguration complete message" may be exchangeable in the present disclosure.

The "conditional handover complete message" referred herein may be a message dedicated to the purpose, or a common message, and the common message carries instruction information indicating the aforementioned purpose. Furthermore, the message carries at least the identity of the UE for the source base station to identify the UE, for example, eNB UE X2AP ID.

The "RRC connection reconfiguration complete message or RRC reconfiguration complete message from the UE" are referred herein. Preferably, the reconfiguration complete message may be the following message.

It may be the first RRC message sent for instructing the UE has completed the conditional handover to the new cell.

It may also correspond to the RRC connection reconfiguration message that the UE received previously for conditional handover, or it may correspond to the RRC connection reconfiguration message performed by the UE when the conditional handover is triggered/activated, or it may correspond to the conditional handover command executed by the UE.

Since the handover may be referred to as performing a reconfiguration process synchronized to a new cell, the conditional handover process referred to herein may also refer to a reconfiguration process performed by a UE to synchronize to a new cell when certain conditions are satisfied.

After receiving the handover complete message sent by the target base station (S105), the source base station may forward the data to the target base station (S106, S107). In this process, it can be understood that when the source base station receives the handover complete message (S105), it is determined that the UE has been handed over to another cell, so that there is no need to provide data to the UE, and the data transmission between the source base station and the UE may be stopped.

Implementation 2

Figure 2:
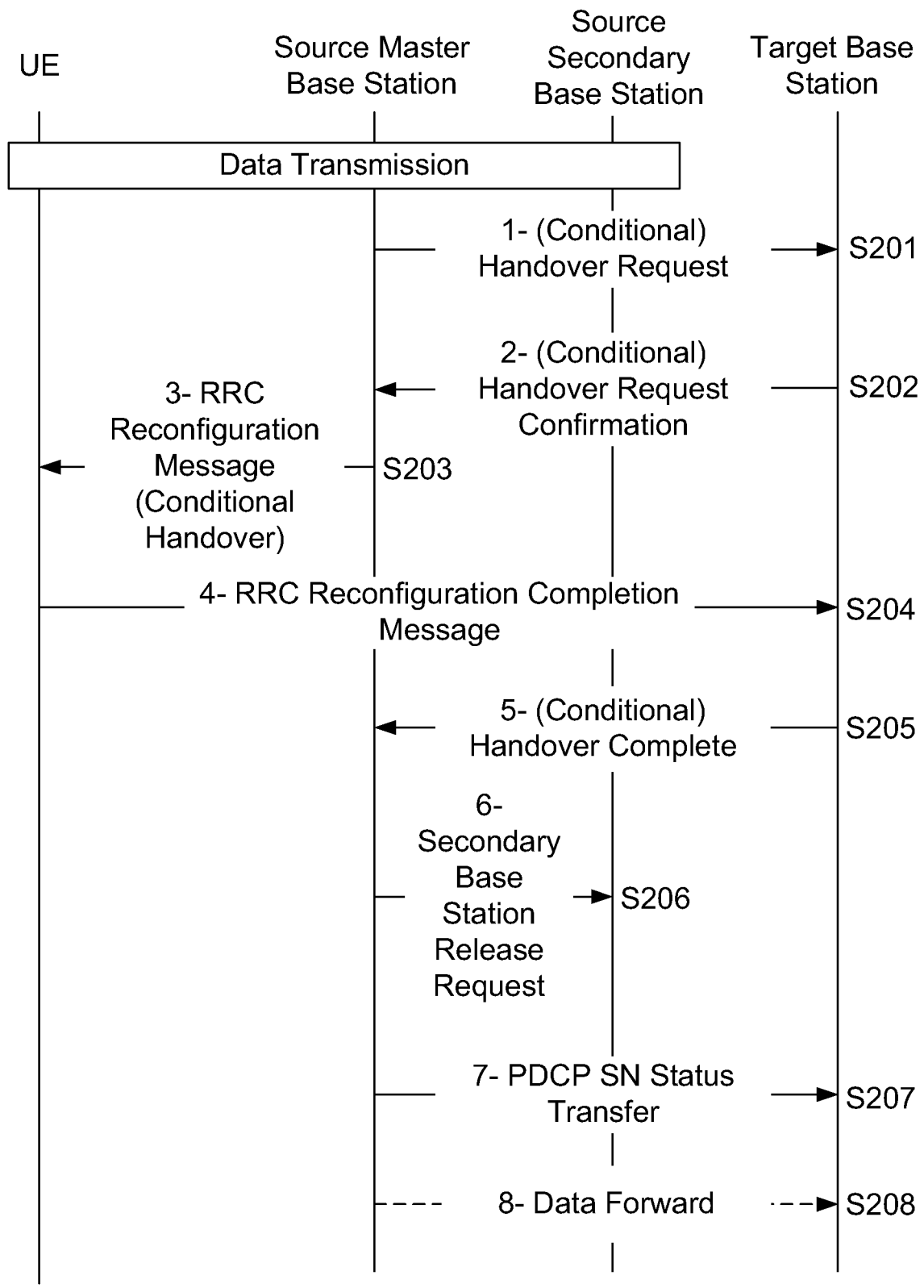
FIG. 2 is a schematic time chart of another implementation of the handover control method of the present disclosure.

Implementation 2 of the present disclosure will be described with reference to FIG. 2. FIG. 2 is a schematic time chart of another implementation of the handover control method of the present disclosure.

In Implementation 2, as shown in FIG. 2, the UE in dual connectivity performs data transmission with a source base station including a source master base station and a source secondary base station. As shown in FIG. 2, Steps S201 to S203 of Implementation 2 are basically the same as Steps S101 to S103 of Implementation 1, with only the "source base station" changed to the "source master base station," and descriptions of the same or similar contents are omitted here.

At Step S204, after receiving the RRC connection reconfiguration complete message or RRC reconfiguration complete message from the UE, the target base station sends a handover complete message to the source master base station (S205). Preferably, at Step S205, the target base station sends the conditional handover complete message to the source master base station. The purpose of the message is to notify the source base station that the UE has accessed the target base station, and, optionally, to notify the source base station that the UE performing conditional handover has accessed the target base station or that the UE has performed and completed the conditional handover. The "conditional handover complete message" referred herein may be a message dedicated to the purpose, or a common message, and the common message carries instruction information indicating the aforementioned purpose. Furthermore, the message carries at least the identity of the UE for the source base station to identify the UE, for example, eNB UE X2AP ID.

After receiving the handover complete message sent by the target base station (S205), the source master base station sends a secondary base station release request to the source secondary base station (S206). It can be understood that when the source master base station receives the handover complete message, it is determined that the UE has been handed over to another cell, so that there is no need to provide data to the UE, and the data transmission between the source master base station and the UE may be stopped. The source master base station may also determine that the source secondary base station may stop providing data to the UE, so that the source master base station sends the secondary base station release request to the source secondary base station (S206).

When the source secondary base station receives the secondary base station release request, it stops sending/providing data to the UE, and optionally, starts forwarding data.

Implementation 3

Figure 3:
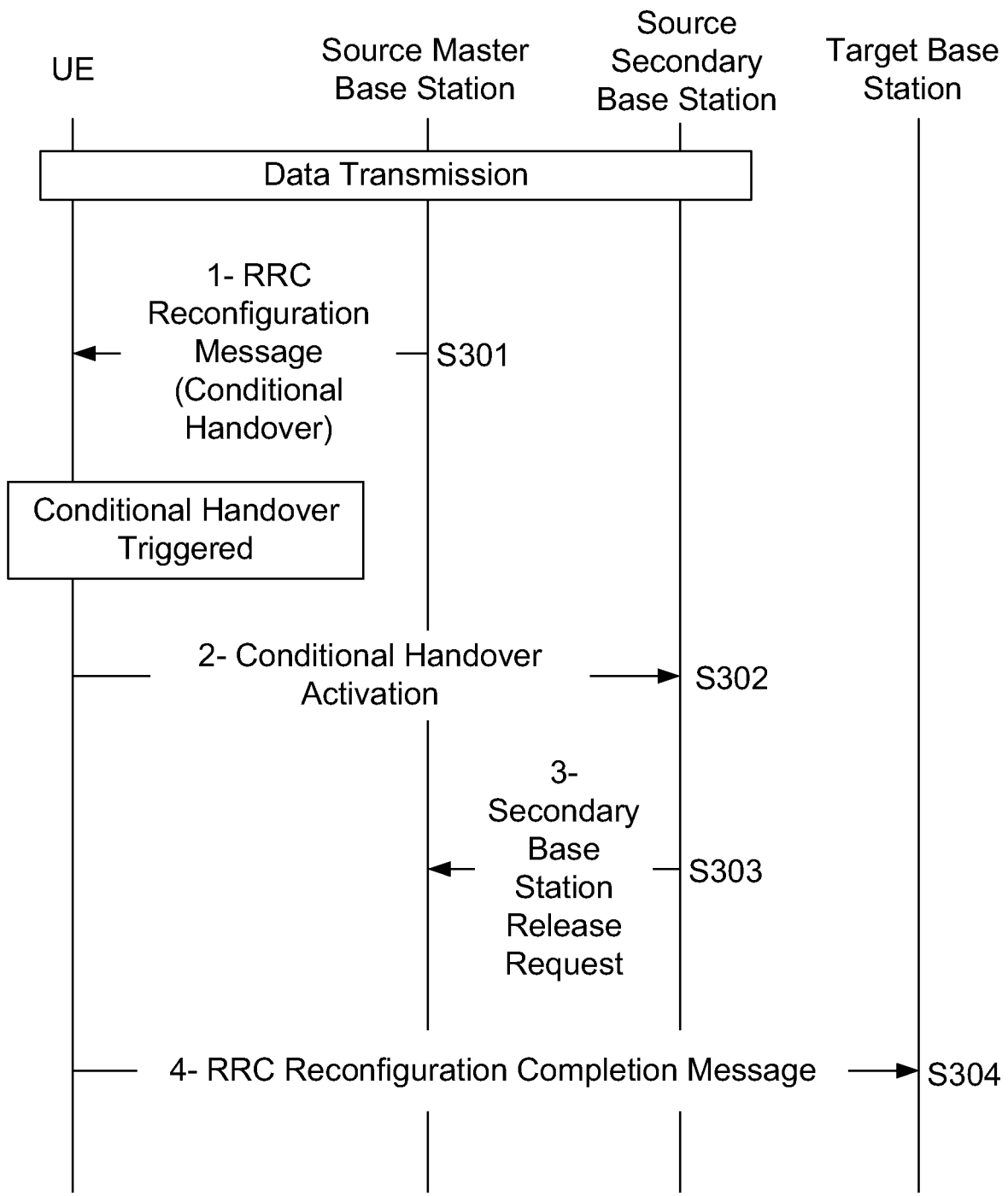
FIG. 3 is a schematic time chart of yet another implementation of the handover control method of the present disclosure.

Implementation 3 of the present disclosure will be described with reference to FIG. 3. FIG. 3 is a schematic time chart of yet another implementation of the handover control method of the present disclosure.

Implementation 3 also includes the steps of the source master base station sending a conditional handover request to the target base station; the target base station sending a conditional handover request confirmation to the source master base station. For being brief, it is not shown in FIG. 3.

After the source master base station receives the conditional handover request confirmation sent by the target base station, at Step S301, the source master base station sends a conditional handover message to the UE, where the conditional handover message may be an RRC reconfiguration message.

When the conditions corresponding to the conditional handover command are satisfied in the UE, or when the conditional handover is triggered, the UE sends information to the secondary base station that manages the secondary cell (S302). For example, a conditional handover activation message may be sent to indicate that the conditional handover is triggered, or indicating to the UE that transmission in the secondary cell group will be suspended, and optionally, the conditional handover is triggered when indicating the reasons of the suspension.

Specifically, the following operations may be performed.

When the conditions corresponding to the conditional handover command are satisfied, or when the conditional handover is triggered, the RRC layer of the UE instructs the SCG MAC to generate the MAC CE, which is used to indicate or carry at least one of the following information.

The transmission in the secondary cell group of the UE will be suspended, and optionally, indicating the reason of the suspension is that the conditional handover is triggered.

The configuration of the secondary cell group of the UE will be released, and optionally, indicating the reason of the release is that the conditional handover is triggered.

The conditional handover is triggered or activated.

After the MAC CE is sent, the UE may stop the uplink transmission and downlink reception of the source SCG cell, and may stop the timers that control the SCG change or release, and may release the entire SCG configurations or reconfigure the DRB, or perform the corresponding configuration operation according to the SCG configuration in the RRC connection reconfiguration information for the conditional handover.

Or, as another example, when the conditions corresponding to the conditional handover command are satisfied, or when the conditional handover is triggered, the RRC layer of the UE generates an RRC message, which is used to indicate or carry at least one of the following information.

The transmission in the secondary cell group of the UE will be suspended, and optionally, indicating the reason of the suspension is that the conditional handover is triggered.

The configuration of the secondary cell group of the UE will be released, and optionally, indicating the reason of the release is that the conditional handover is triggered.

The conditional handover is triggered or activated.

After the RRC message is sent, the UE may stop the uplink transmission and downlink reception of the source SCG cell, and may stop the timers that control the SCG change or release, and may release the entire SCG configurations or reconfigure the DRB, or perform the corresponding configuration operation according to the SCG configuration in the RRC connection reconfiguration information for the conditional handover.

The RRC message referred to herein may be transmitted through SRB3. That is, if the UE is not configured with SRB3, the UE may not transmit the RRC message.

When the source secondary base station receives the conditional handover activation information (S302), it may stop sending/providing data to the UE. Preferably, the source secondary base station may also send messages to the source master base station to indicate that the conditional handover of the UE is triggered/activated/performed. When the source master base station receives the message indicating or carrying the information, the source master base station may stop sending/providing data transmission to the UE. Preferably, the source secondary base station may send a secondary base station release request message (S303) (e.g., SENB RELEASE REQUIRED) to the source master base station, and the message carries indication information. The indication information indicates at least one of the following information.

The transmission in the secondary cell group of the UE will be suspended, and optionally, indicating the reason of the suspension is that the conditional handover is triggered.

The configuration of the secondary cell group of the UE will be released, and optionally, indicating the reason of the release is that the conditional handover is triggered.

The conditional handover is triggered or activated.

The source master base station may determine that the UE has performed the conditional handover based on the secondary base station release request message mentioned above, and therefore, stop providing data to the UE.

Implementation 4

Figure 4:
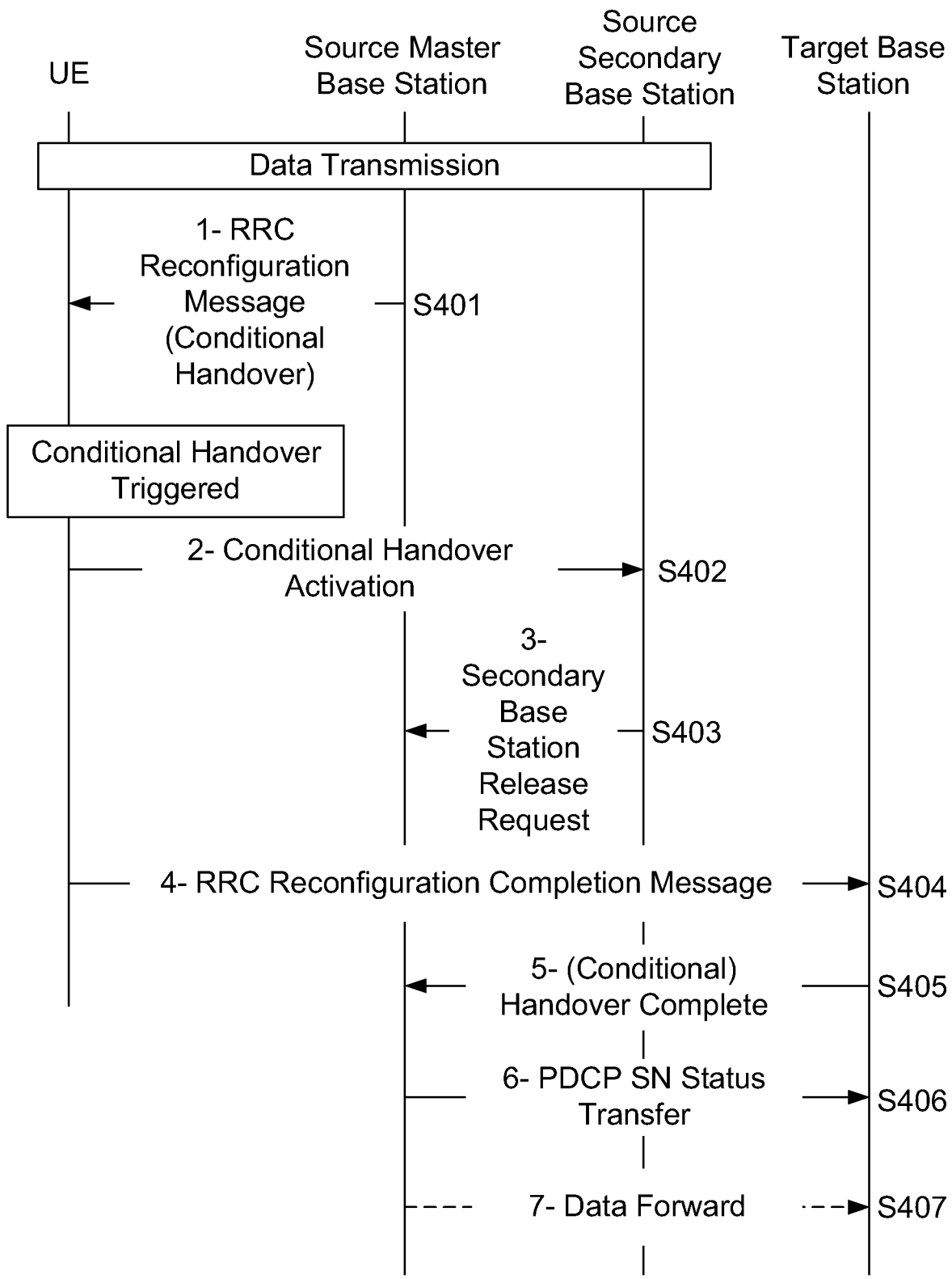
FIG. 4 is a schematic time chart of another implementation of the handover control method of the present disclosure.

Implementation 4 of the present disclosure will be described with reference to FIG. 4. FIG. 4 is a schematic time chart of another implementation of the handover control method of the present disclosure.

In Implementation 4, Implementation 2 and Implementation 3 may be combined and used. For the contents that are the same as or similar to those in Implementations 2 and 3, the descriptions are omitted here. For those, please refer to the corresponding parts in Implementations 2 and 3 (FIGS. 2 and 3) described above.

Specifically, in Implementation 4, when the conditions corresponding to the conditional handover command are satisfied, or when the conditional handover is triggered, the UE sends information to the secondary base station that manages the secondary cell (S402), which may be conditional handover activation information. Furthermore, the target base station that receives the RRC reconfiguration complete message sent by the UE sends a conditional handover complete message to the source master base station (S405). For the specific operations after receiving the conditional handover complete message, please refer to the descriptions in Implementation 2 and Implementation 3, which will not be repeated here.

Furthermore, when the target master base station adds the target secondary base station, since the resources allocated by the target secondary base station (corresponding to the relevant configuration of the secondary serving cell) are time-sensitive, which affects the resource management and operation management of the UE and the base station. Therefore, how to avoid operational errors and connection failure caused by configuration failure is a problem that needs to be addressed. These problems are discussed in Implementations 5 to 7.

Implementation 5

During the conditional handover preparation stage (the period during which the source base station sends a handover request and receives the handover request confirmation sent by the target base station), when the target base station receives a conditional handover request from the source base station, the target base station sends a secondary base station addition request message to another base station (referred to herein as a target secondary base station). In the addition request message, the target base station directly or indirectly, implicitly or explicitly, indicates that the secondary base station addition request is used for conditional handover.

The target secondary base station that receives the addition request message may determine whether to receive the secondary base station addition request based on the indication information.

Implementation 6

On the basis of Implementation 5, the secondary base station addition request message received by the base station may carry a time parameter, and the parameter is used for the secondary base station to set a timer $T_{DCoverall}$.

The specific setting method may be that the target secondary base station directly sets the running time of the timer equal to the value of the time parameter; or sets the running time of the timer equal to the value of the time parameter plus or minus a certain variable; or using this time parameter as a reference to set the running time of the timer, which may be considered as setting the time length of the timer $T_{DCoverall}$ based on the time parameter.

When the secondary base station addition request is received/determined by the target secondary base station, the target secondary base station will start the timer $T_{DCoverall}$. When the timer times out, the target secondary base station will initiate the secondary base station release request, that is, send the secondary base station release request (e.g., SENB RELEASE REQUIRED) to the target base station. If the target secondary base station receives information relating to the reconfiguration complete from the target base station during the running of the timer $T_{DCoverall}$, the running the timer $T_{DCoverall}$ is stopped.

Alternatively, when the secondary base station receives a secondary base station addition request message for indicating the conditional handover request (or is related to the conditional handover request), the timer T0 is started. The method for setting the duration of T0 is the same as those for setting $T_{DCoverall}$ described above. The difference between T0 and $T_{DCoverall}$ is that T0 is only used for the secondary base station addition requests related to the conditional handover requests, while $T_{DCoverall}$ is used other than the secondary base station requests that are not related to the conditional handover.

Implementation 7

In the message received by the UE that carries information related to conditional handover (for example, RRC reconfiguration message), if it includes the configuration of dual connectivity, that is, it includes both the configuration of the master serving cell group and the configuration of the secondary serving cell group, then correspondingly, it may also include a time length configuration for the validity of the master serving cell group configuration, and a time length configuration for the validity of the secondary serving cell group configuration. In a specific implementation, the following operations may be performed.

When the UE receives the dual connection configuration for conditional handover, it starts different timers T1 and T2 for the configuration of the master serving cell and the configuration of the secondary serving cell, respectively. The time length configuration of T1 is as the time length configuration for the validity of the master serving cell group configuration described above; the time length configuration of T2 is as the time length configuration for the validity of the secondary serving cell group configuration described above. Preferably, T2 is less than or equal to T1.

When T2 times out, the related configuration of the secondary serving cell becomes invalid.

When T1 times out, the related configuration of the master serving cell becomes invalid.

The "configuration invalid" referred to herein indicates that the UE will not perform the corresponding configurations.

When T2 times out and T1 is still running, if the corresponding conditional handover is triggered, the UE may perform the related configuration of the master serving cell as received, and not perform the related configuration of its corresponding secondary serving cell. In addition, the reconfiguration complete message sent to the target base station may further indicate that the related configuration of the secondary cell is released.

Wherein, "not perform the related configuration of its corresponding secondary serving cell" is related to the configuration of the UE before performing the conditional handover. If the UE does not have the dual connectivity configuration before performing the conditional handover and only has the related configuration of the master serving cell, the UE does not perform the related configuration of its corresponding secondary serving cell. If the UE has a valid dual connectivity configuration before performing the conditional handover, then "[the UE does] not perform the related configuration of its corresponding secondary serving cell" specifically indicates that the UE releases the related configuration of the existing secondary serving cell, and preferably, does not perform the related configuration of the secondary serving cell included in the conditional handover instruction received.

Correspondingly, when the target base station receives the reconfiguration complete message sent by the UE and the message indicates that the related configuration of the secondary cell is released or unsuccessful, the target base station may send a secondary base station release request (SENB RELEASE REQUEST).

Implementation 8

Figure 6:
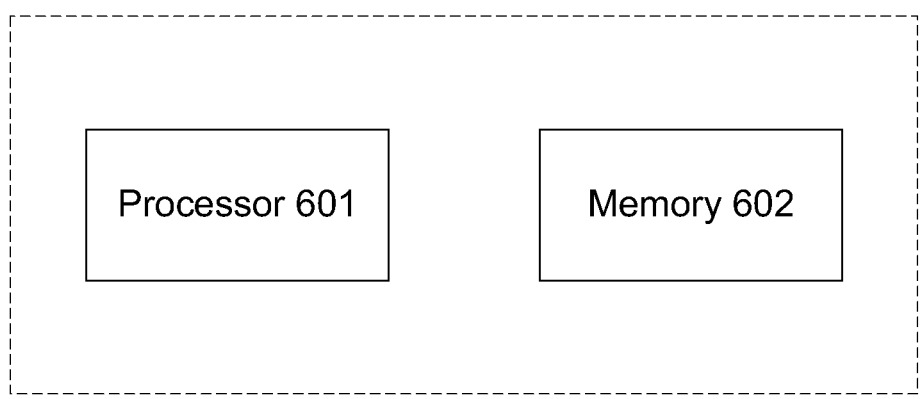
FIG. 6 is a block diagram of a communications device according to an implementation of the present disclosure.

Implementation 8 of the present disclosure will be described with reference to FIG. 6. FIG. 6 is a block diagram of a user equipment (or communications device) 60 according to an implementation of the present disclosure. As shown in FIG. 6, the user equipment (or communications device) 60 comprises a processor 601 and a memory 602. The processor 601, in one example, may comprise a microprocessor, a microcontroller, an embedded processor etc. The memory 602, in one example, may comprise volatile memory (e.g., random access memory RAM), a hard disk drive (HDD), non-volatile memory (e.g., flash memory), or any other memories. The memory 602 stores program instructions. The program instructions, when executed by the processor 601, cause the user equipment to carry out the methods as disclosed herein.

According to the present disclosure, executing programs stored on equipment may be implemented by controlling a Central Processor Unit (CPU) and causing a computer to realize the program functions of the present disclosure. The program or the information being processed by the program may be stored in volatile memory (e.g., random access memory (RAM)), a hard disk drive (HDD), non-volatile memory (e.g., flash memory), or any other suitable memory system.

The program that realizes functions of each implementation in the present disclosure may be stored on a computer-readable medium. Computer systems through reading the programs stored in the storage medium executes the programs to realize the corresponding functions. The "computer system" disclosed herein may be a computer system embedded in equipment, may include an operating system or hardware (e.g., peripheral equipment). A "computer-readable medium" may be a semiconductor storage medium, optical storage medium, a magnetic storage medium, a storage medium for short-term dynamic storing of programs, or any other storage medium readable by a computer.

Various characteristics or function modules used in the equipment disclosed in the implementations herein may be realized or implemented by electronics such as a monolithic or multiple-chip integrated circuit. The electronics designed for implementing the functions disclosed herein may include general processors, a digital signal processor (DSP), Applications Specific Integrated Circuitry (ASIC), Field Programmable Gate Arrays (FPGAs) or any other programmable logic devices, discrete gate or transistor logic, discrete hardware assembly, or any combination of the disclosed devices. A general processor may be a microprocessor, or any present processor, controller, microcontroller, or state machine. The disclosed electronics may be digital electronics or analog electronics. As semiconductor technology continues to improve, it is noted that there may be new integrated circuit technology replacing present integrated circuits, one or more implementations of the present disclosure may be implemented with the new integrated circuit technology.

Moreover, the present disclosure is not limited to the disclosed implementations. Although various examples are disclosed in each implementation, it should be noted that the present disclosure is not limited thereto. Fixed or non-mobile electronic equipment installed indoor or outdoor may be in a form of terminal equipment or communications equipment. For example, the electronic equipment may be Audio-Video equipment, kitchen equipment, cleaning equipment, air-conditioner, office equipment, vending machines, and other home appliances etc.

As above, the implementations of the present disclosure are disclosed in detail with reference to the accompanying drawings. However, the implementations are not limited to the disclosed implementations. The present disclosure also includes design variations without departing from the scope or spirit of the disclosed concepts. Furthermore, the present disclosure also encompasses modifications within the scope of the claims, implementations suitably combining various disclosed implementations. Additionally, the disclosed implementations may have component substitutions that have similar effect.

What is claimed is:

1. A handover control method performed by a source master base station (BS), the handover control method comprising:
   transmitting a conditional handover request to a target BS;
   when a handover request confirmation message is received from the target BS, transmitting a conditional handover message to a user equipment (UE);
   receiving a conditional handover complete message from the target BS in response to a Radio Resource Control (RRC) connection reconfiguration complete message being sent from the UE to the target BS; and
   when the UE is configured to operate in dual connectivity operation by communicating additionally with a source secondary BS, transmitting a secondary BS release request message to the source secondary BS in response to receiving the conditional handover complete message from the target BS.

2. The handover control method according to claim 1, further comprising:
   in response to receiving the conditional handover complete message, forwarding data to the target BS.

3. The handover control method according to claim 1, wherein the source secondary BS receives a conditional handover activation message from the UE in response to a conditional handover is triggered based on the conditional handover message received by the UE.

4. The handover control method according to claim 3, wherein the conditional handover activation message is received by the source secondary BS before the RRC connection reconfiguration complete message is received by the target BS.

5. The handover control method according to claim 3, wherein the conditional handover activation message is included in a Medium Access Control (MAC) control element (CE) or an RRC message.

6. The handover control method according to claim 3, wherein:
   the source secondary BS no longer forwards data to the UE after receiving the conditional handover activation message and transmits an indication message to the source master BS indicating that the conditional handover is triggered; and
   the source master BS no longer forwards data to the UE after receiving the indication message.

7. A source master base station (BS) performing handover control, the source master BS comprising:
   at least one processor; and
   at least one memory coupled to the at least one processor and storing one or more instructions that, when executed by the at least one processor, cause the source master BS to:
   transmit a conditional handover request to a target BS;
   when a handover request confirmation message is received from the target BS, transmit a conditional handover message to a user equipment (UE);
   receive a conditional handover complete message from the target BS in response to a Radio Resource Control (RRC) connection reconfiguration complete message being sent from the UE to the target BS; and
   when the UE is configured to operate in dual connectivity operation by communicating additionally with a source secondary BS, transmit a secondary BS release request message to the source secondary BS in response to receiving the conditional handover complete message from the target BS.

8. The source master BS according to claim 7, wherein the one or more instructions, when executed by the at least one processor, further cause the source master BS to:
   when the conditional handover complete message is received, forward data to the target BS.

9. The source master BS according to claim 7, wherein when a conditional handover is triggered based on the conditional handover message received by the UE, the source secondary BS receives a conditional handover activation message from the UE.

10. The source master BS according to claim 9, wherein the conditional handover activation message is received by the source secondary BS before the RRC connection reconfiguration complete message is received by the target BS.

11. The source master BS according to claim 9, wherein the conditional handover activation message is included in a Medium Access Control (MAC) control element (CE) or an RRC message.

12. The source master BS according to claim 9, wherein:
    the source secondary BS no longer forwards data to the UE after receiving the conditional handover activation message and transmits an indication message to the source master BS indicating that the conditional handover is triggered, and the source master BS no longer forwards data to the UE after receiving the indication message.

* * * * *

UNITED STATES PATENT AND TRADEMARK OFFICE
CERTIFICATE OF CORRECTION

PATENT NO. : 11,974,175 B2
APPLICATION NO. : 17/290438
DATED : April 30, 2024
INVENTOR(S) : Chongming Zhang and Renmao Liu It is certified that error appears in the above-identified patent and that said Letters Patent is hereby corrected as shown below:

On the Title Page

Item (71), should read:
(71) Applicants: SHARP KABUSHIKI KAISHA, Sakai City, Osaka (JP);
FG Innovation Company Limited, Tuen Mun (HK)

Signed and Sealed this
Seventh Day of January, 2025

Derrick Brent
*Acting Director of the United States Patent and Trademark Office*